Jan. 9, 1945. A. D. PENTZ 2,367,048
CENTRIFUGAL CLUTCH
Original Filed Dec. 4, 1941
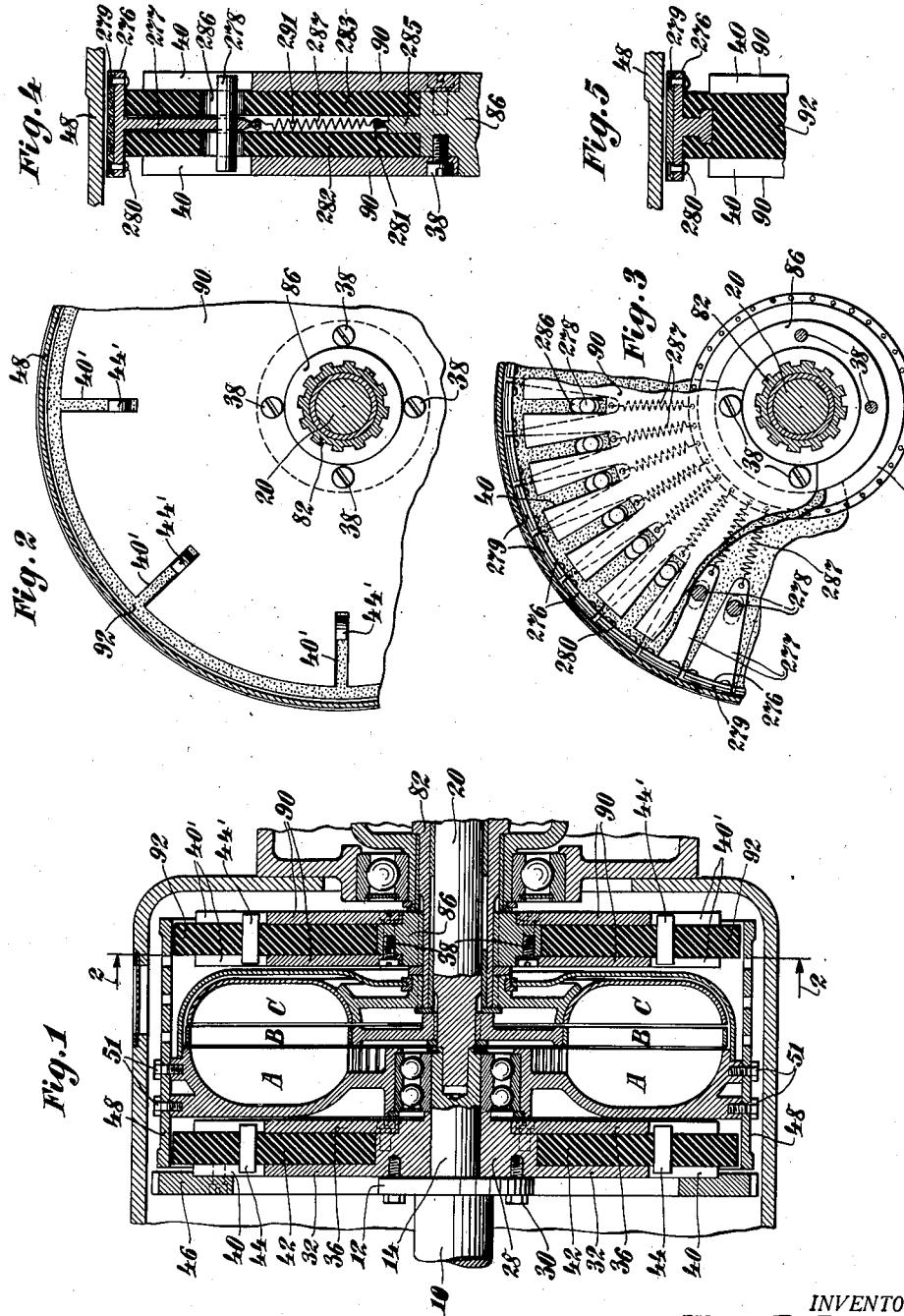
INVENTOR.
Albert D. Pentz,
BY
Alexander Chessin
his ATTORNEY.

Patented Jan. 9, 1945

2,367,048

UNITED STATES PATENT OFFICE 2,367,048

CENTRIFUGAL CLUTCH

Albert D. Pentz, New York, N. Y.

Original application December 4, 1941, Serial No. 421,530. Divided and this application November 11, 1942, Serial No. 465,187

17 Claims. (Cl. 192—105)

This invention is concerned with centrifugal clutches and, more particularly, with clutches of this character depending for their operation on an elastic element forming an inherent part thereof.

Such a clutch is disclosed in my copending application, Ser. No. 421,530, of which this is a division, but, although in both, the aforesaid application and the present case, the clutch is shown as a part of a power transmission mechanism, it has a much wider range of usefulness, since it is applicable to all mechanisms wherein it is desired to automatically connect and disconnect rotating or rotatable parts and to rotatably lock and unlock these parts.

In addition to this general purpose, it is also an object of the present invention to produce a clutch which attains its positive, final effect gradually, permitting a certain degree of slippage between the engageable members before the final, locking stage, so that the shock of a sudden lock is avoided, and the clutching proceeds in a smooth, even manner. Another object attained is a cushioning effect tending to further smooth the engagement of operating parts, as will be explained below. It is further an object of the invention to produce a device of this character wherein the clutching effect is uniform along the entire surface of contact between the engaging members of the clutch, thereby attaining a higher degree of efficiency, as compared with devices of this nature wherein the engagement is divided between a multiplicity of elements, such as centrifugal shoes. Another object is to produce a clutch in which no portion is subject to more wear and tear than any other portion, i. e., in which resistance to wear is equally distributed over the operating elements, thereby eliminating weak spots and insuring a longer life of the clutch. It is also an object of the invention to produce a clutch which is completely automatic both, as to the locking and the releasing operations, and which is extremely simple in construction and in operation, having only a few parts. A further object is to produce a clutch which becomes operative only when the centrifugal forces to which it is subject attain a predetermined value and which becomes inoperative when these forces fall below this predetermined value. For instance, when the clutch is used to connect the driving shaft of a motor vehicle transmission mechanism with the impeller of a liquid coupling, the clutch may be designed to be inoperative so long as the engine is idling. Still another object of the present invention is to produce a clutch provided with means for avoiding "chattering" of the coacting elements, by preventing engagement of these elements until the centrifugal forces controlling the operation of the device have reached the necessary magnitude. A still further object is to regulate the slippage between the engaging elements of the clutch when necessary to prevent "seizing" which may take place at some points of the contact surface and which may interfere with the uniform and smooth operation of the device. Other objects will become apparent from the specification which follows and will be more readily appreciated after its perusal.

In describing my clutch, I have adopted a terminology well known in a variety of mechanisms, although not generally used in connection with clutches, namely, the terms "male member" and "female member," as applied to the coacting elements of the clutch, the male member being the active element and the female member the passive or inactive element, as will be clear from the specification.

In the accompanying drawing, wherein the numerals are identical with those used in my aforesaid copending application for the same or corresponding elements in order to facilitate their comparison, Figure 1 is an axial cross sectional view of a portion of a transmission mechanism such as is shown in the aforesaid application, disclosing the clutch which constitutes the present invention. Figure 2 is a cross section taken along the line 2—2 of Figure 1. Figure 3 is a fragmentary view similar to Figure 2, but for a modified form of the invention. Figure 4 is a radial cross section of the device illustrated in Figure 3. Figure 5 is a fragmentary radial cross section of another modification of my clutch.

Referring to the figures in detail, 10 is the end of the crankshaft of an engine in a power transmission mechanism. The shaft 10 is provided with a flange 12, from which there extends axially a shaft portion 14 of reduced diameter. In the shaft portion 14 is piloted an intermediary coaxial shaft 20. A sleeve 82 on the shaft 20 is connected with the driven shaft of the transmission mechanism for rotation in unison therewith and, for the purpose of this application, may be considered as the driven shaft itself. Secured to the flange 12 is an annular ring 28, as by bolts 30. The ring 28 is formed with a disc or plate 32 on one side and, on the other, with an annular plate 36 secured to the ring 28 in parallel relationship to the disc 32, as by screws 38. The discs 32 and 36 are provided proximate their outer peripheries with registering slots 40. Between the discs 32 and 36 and substantially confined therebetween, with, however, sufficient lateral space to allow expansion under the action of heat and of centrifugal forces, is a power disc or ring 42 of an elastic material, such as, for instance, rubber, preferably, but not necessarily extending beyond the discs 32 and 36. Embedded in the disc 42 are a plurality of equi-angularly disposed drive pins 44, preferably, though not necessarily, of round cross section. The pins 44 are provided with means for preventing their displacement, such as lugs projecting perpendicularly therefrom. Although these lugs are not shown in Figure 1, so as not to unduly complicate the drawing, this simple and well known construction may be gathered from Figure 4 wherein the lower portion of the shank 277 would constitute such a lug. The purpose of the drive pins 44 is mainly to assure immediate and constant participation of the disc 42 in the rotation. When this rotation attains sufficient magnitude, the disc 42 comes into engagement with the drum 48 and then laterally with the two plates 32 and 36, and the drive takes place through these engagements.

The power transmission mechanism herein illustrated includes a liquid coupling comprising an impeller A, and impelled member C, and a runner B intermediate A and C. To the impeller A is removably secured a cylindrical drum 48, as by bolts 51. The runner B is connected with the intermediary shaft 20, and the impelled member C is connected with the driven shaft 82. To the shaft 82 is splined the hub 86 of a second power disc 92 confined between two plates 90, 90, following a construction similar to that shown for the disc 42 and the plates 32, 36, with corresponding slots 40' and drive pins 44'.

The spacing between the power disc 42 and the drum 48 is determined as follows. Let the radial increment due to the expansion of the disc in response to the centrifugal forces created by the rotation of the shaft 10 be denoted by $\Delta r$. This increment has a definite value depending partly on the shape and dimensions of the disc and partly on the characteristics of the material of which it is made, for a definite, predetermined speed of rotation of the shaft 10. The spacing between the disc 42 and the drum 48 is made slightly less than the increment $\Delta r$, so that contact between the disc 42 and the drum 48 is effected just before the speed of rotation of the shaft 10 reaches the aforesaid predetermined value, and upon this predetermined speed being actually reached, the disc 42 and the drum 48 become firmly engaged and, in their locked condition, will rotate as a unit.

The male member of the clutch for connecting the shaft 10 and the impeller A comprises the two plates 32, 36, and the power disc 42 therebetween. Likewise, the male member for connecting the driven shaft 82 and the driving shaft 10 comprises the two plates 90, 90, and the power disc 92 therebetween, assuming that the impeller A and the driving shaft 10 have been connected for rotation as a unit. (As is shown in my copending application above referred to, the impeller may be connected to the driving shaft directly instead of through the clutch.) The female member of both clutches is the same, namely, the drum 48. It will be noted that the male member, although being the active one, is not necessarily on the driving part of the mechanism. It is always on the part which creates the centrifugal forces controlling the expansion of the elastic element of the clutch. Thus, while, in the clutch 32—36—42, it is the centrifugal force created by the rotation of the shaft 10 which controls the operation, it is the centrifugal force created by the rotation of the driven shaft which controls the operation of the clutch 90—92—90.

In some situations, it has been found that rubber from the discs 42 and 92 adheres to the drum 48, so that a coating of particles from the discs builds up on the drum 48. When a disc expands into contact with the so coated metal surface, a seizing condition between the disc and the drum is created at some points of the contact surface, which results in a too rapid engagement between them, and a smooth operation is not always obtained. To obviate this difficulty, the periphery of the disc 42 or 92 may be provided with a friction surface not subject to this seizing effect. This modification of my clutch is illustrated in Figure 5, wherein a plurality of T-shaped rigid segments 276, of metal or other suitable material, are anchored in the disc along its periphery, circumferentially slightly spaced from one another. The segments 276 are provided with a facing or lining material 279 which is free from the aforesaid seizing characteristics. For instance, I may use a fibrous material, such as molded asbestos brake lining for these facings, riveting the lining to the segments 276, as indicated at 280. Thus arranged, a desired degree of slippage is provided, by regulating the slippage normally preceding complete engagement between the male and the female members of the clutch, effectively overcoming a possible velocity differential between them just before their final, locking engagement or just before their release from one another. An additional advantage of this arrangement is that rubber wear is greatly reduced thereby.

In any modification, the power discs may, in some situations, expand in more than one direction. This would have two effects. In the first place, when the plates 32, 36, or the plates 90 do not extend all the way to the periphery of the rubber disc, the lateral expansion of the rubber in the wake of its radial expansion will fan out and engage a wider surface of the female member 48, thus increasing the surface of engagement between the coacting members and, therefore, adding to the grip of one on the other, as the centrifugal forces increase. In the second place, and this is especially true when the plates 32, 36 or 90 extend all the way or close to the periphery of the rubber disc, the lateral expansion of the rubber under increased centrifugal forces will cause firm engagement between the rubber disc and the plates between which it is held, thereby adding to the driving force of the pins 44 when transmitting power.

In some situations, it has been found that the centrifugal force acting on the clutch may be short of the necessary power and will do no more than bring the male and the female members into contact with one another, but not into actual locking engagement, or only temporarily into such an engagement, with the result that "chattering" of the coacting elements takes place. To prevent this, I provide means for restraining the engagement between the male and the female members of the clutch until a predetermined centrifugal force is attained in the operation of the device. Such a means is illustrated in Figures 3 and 4, wherein the elastic expansible element comprises two parts, 282 and 283, supported on the hub 86, but separated by a flange 285 on the hub. At their peripheries, the discs 282 and 283 carry T- shaped segments 276 similar to those shown in Figure 5, but, in this case, the segments are not anchored in the rubber discs but are provided with radially extending shanks 277 having, proximate their lower ends, cross arms 278 having the same function as the pins 44 in Figure 1 and passing through slots 286 in the discs 282, 283, as well as through the slots 40 (or 40') in the plates 32, 36 (or 90, 90). The segments 276 are provided with a facing 279, as in the modification shown in Figure 5. Tension means 287 in the space 291 between the two rubber discs extend from the end of the shanks 277 to the hub 86, shown here as springs attached at one end to the shanks 277 and, at the other, to lugs 281 on the flange 285. These tension means act to regulate the effect of the centrifugal forces on the rubber discs, being so designed as to cause the segments 276 to be held off the drum 48 until the speed of rotation of the hub 86 is sufficient to overcome the tension of the springs 287.

While it is true that in both the modification shown in Figure 5 and Figures 3, 4, the centrifugal forces act on a multiplicity of segmental elements and not along an uninterrupted periphery, as in the case illustrated in Figure 1, whatever lack of uniformity may occur by this arrangement is promptly dissipated because the expansion of the rubber discs 282, 283, following the centrifugal movement of the segments, effects a uniform pressure on the segments over the entire surface of contact.

Obviously, the two discs 282, 283 may be replaced by a single disc with suitable passages for the driving pins and the tension springs. It is worthy of observation, also, that the helical winding movement of the rubber disc adjacent the plates within which it is confined serves as an excellent cushion for the engagement of the coacting elements as well as for their release from one another, thus greatly adding to the smooth operation of the clutch.

The modification illustrated in Figures 3 and 4 may also be adopted when it is desired to prevent the engagement of the coacting elements of the clutch until the rotation of the part of the mechanism producing the centrifugal forces attains a predetermined speed, as in the case of a power transmission mechanism comprising a liquid coupling, and it is desired to prevent transmission from taking place until the driving shaft reaches a certain, predetermined speed, for instance, a speed above the idling speed of the engine.

Many other modifications of my clutch will readily suggest themselves to those versed in the art, without passing beyond the scope of the present invention, and it is to be understood that the examples here presented serve mainly as illustrations of the invention.

I claim:

1. In a mechanism having rotatable elements, means for coupling two such elements, comprising a member rotatable with one of said two elements and a cooperating member on the other one of said two elements, said first mentioned member including a disc of an elastic material subject to both radial and lateral expansion by the molecular action of this material, said radial expansion being in response to centrifugal forces created by the rotation of the first one of said two elements and causing said disc to come into engagement with said cooperating member, and said lateral expansion, following said radial expansion after said disc has come into contact with said cooperating member, causing said disc to come into engagement laterally with said first element.

2. In a mechanism having rotatable elements, means for coupling two such elements, comprising a member rotatable with one of said two elements and a cooperating member on the other one of said two elements, said first mentioned member including a disc of a homogeneous elastic material subject to both radial and lateral expansion said radial expansion causing said disc to come into engagement with said cooperating member in response to centrifugal forces created by the rotation of the first one of said two elements, and said lateral expansion causing said disc to come into engagement laterally with said first element after said engagement of the disc with said cooperating member.

3. In a mechanism having rotatable elements, means for coupling two such elements, comprising a member rotatable with one of said two elements as a unit and a cooperating member on the other one of said two elements, said first mentioned member including a disc of a homogeneous elastic material subject to both radial and lateral expansion, the radial expansion being in response to centrifugal forces created by the rotation of the first one of said two elements and causing said disc to come into radial engagement with said cooperating member, said lateral expansion, following said radial expansion after said radial engagement of said disc, causing said disc to come laterally into engagement with said first element, said radial engagement allowing for some slippage until said rotation attains a predetermined speed at which the engagement becomes a lock.

4. A mechanism according to claim 2, wherein the homogeneous elastic material is rubber.

5. A mechanism according to claim 2, wherein the homogeneous elastic material is rubber, and the rubber disc is provided with friction means for regulating its engagement with the cooperating member.

6. A mechanism according to claim 2, wherein the disc of homogeneous elastic material is provided with friction means for regulating its engagement with the cooperating member.

7. A centrifugal clutch for rotatably connecting two elements of a mechanism, consisting of a male member rotatable with one of said elements as a unit, and a female member on the other one of said elements, said male member comprising a pair of spaced parallel plates, a disc subject to both radial and lateral expansion between said plates, said lateral expansion causing said disc to come into engagement with said plates and said radial expansion causing said disc to come into engagement with said female member, and additional means for rotatably connecting said disc with said plates.

8. A clutch according to claim 7, wherein the disc is provided with friction means for regulating the connection between the male and the female members of the clutch.

9. A clutch according to claim 7, wherein the disc is a rubber disc.

10. A clutch according to claim 7, wherein the disc is a rubber disc and provided with friction means for regulating the engagement between the male and the female members of the clutch.

11. A centrifugal clutch for rotatably coupling two elements of a mechanism, consisting of a male member rotatable with one of said elements as a unit, and a female member on the other one of said elements radially engageable by said male member in response to centrifugal forces, said male member comprising a pair of spaced parallel plates, a rubber disc between said plates having slots at a right angle thereto, said plates having slots in registry with the slots in said disc, drive pins through said disc slots and said plate slots, and means for preventing displacement of said pins relatively to said disc, lateral expansion of said disc, following the engagement between said male and said female clutch members, bringing said disc into engagement with said plates.

12. A clutch according to claim 11, wherein rigid segments are anchored in the rubber disc and circumferentially spaced along its periphery, and a lining is provided on said segments to prevent seizing between said segments and the surface of the female member upon their engagement.

13. A centrifugal clutch for rotatably connecting two elements of a mechanism, consisting of a male member rotatable with one of said elements as a unit, and a female member on the other one of said elements, said male member comprising a pair of spaced parallel plates, an elastically expansible disc between said plates, said female member having a surface engageable by said disc when said centrifugal forces attain a predetermined value, said plates being sufficiently spaced from said disc laterally to allow for the expansion of the disc under the action of heat and of centrifugal forces after its radial expansion has reached its limit, said disc coming into engagement with said plates when said centrifugal forces assume sufficient magnitude, and additional means for rotatably connecting said disc with said plates when the disc is not in engagement with said plates.

14. A clutch according to claim 13, wherein the additional connecting means between the disc and the plates are drive pins.

15. A clutch according to claim 13, wherein the female member is in uniform circumferential contact with the disc when in engagement therewith.

16. In a mechanism having rotatable elements, means for coupling two such elements, consisting of a male member rotatable with one of said two elements as a unit, and a cooperating female member on the other one of said two elements, said male member including a homogeneous elastic disc expansible in response to centrifugal forces created by the rotation of the first one of said two elements, and said female member being provided with a surface engageable by said elastic disc and spaced therefrom, when in repose, at a distance substantially equal to the radial increment of said elastic disc when said centrifugal forces attain a predetermined value, said disc coming into lateral engagement with said first one of said two elements upon the engagement of said male and female members.

17. A centrifugal clutch according to claim 7, wherein the expansible disc extends beyond the outer circumferences of the plates.

ALBERT D. PENTZ